United States Patent
Chae et al.

(10) Patent No.: US 11,967,862 B2
(45) Date of Patent: Apr. 23, 2024

(54) WINDING PATTERN OF A MOTOR AND A MOTOR DRIVING SYSTEM

(71) Applicants: HYUNDAI MOTOR COMPANY, Seoul (KR); KIA CORPORATION, Seoul (KR)

(72) Inventors: Woong Chan Chae, Gwangmyeong-si (KR); Jung Shik Kim, Seoul (KR); Jong Hoon Lee, Seoul (KR); Byung Kwan Son, Suwon-si (KR); Sang Hoon Moon, Yongin-si (KR); Young Jin Shin, Changwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 226 days.

(21) Appl. No.: 17/527,876

(22) Filed: Nov. 16, 2021

(65) Prior Publication Data

US 2022/0385121 A1    Dec. 1, 2022

(30) Foreign Application Priority Data

Jun. 1, 2021    (KR) ..................... 10-2021-0070685

(51) Int. Cl.
*H02K 1/16*    (2006.01)
*H02K 3/16*    (2006.01)
(Continued)

(52) U.S. Cl.
CPC ............... *H02K 1/165* (2013.01); *H02K 3/16* (2013.01); *H02K 3/28* (2013.01); *H02K 11/30* (2016.01);
(Continued)

(58) Field of Classification Search
CPC ............ H02K 1/165; H02K 3/16; H02K 3/28; H02K 11/30; H02K 2201/03;
(Continued)

(56) References Cited

U.S. PATENT DOCUMENTS 9,742,334 B2 *    8/2017   Kim ..................... H02P 25/188
9,871,417 B2 *    1/2018   Saito .................... H02K 16/00
(Continued)

FOREIGN PATENT DOCUMENTS

JP        2009165318      *    7/2009
WO    WO 2019156058    *    8/2019

*Primary Examiner* — Ahmed Elnakib
(74) *Attorney, Agent, or Firm* — Lempia Summerfield Katz LLC

(57)    ABSTRACT

In a driving system, first and second inverters are connected to a driving motor, one end of a stator winding through which 3-phase current flows is connected to an output line of the first inverter, and the other end of the stator winding is connected to an output line of the second inverter. A winding pattern of the driving motor includes: coils wound in slots defined in the stator and to which 3-phase current is applied; coils wound on innermost and outermost sides based on a direction toward a rotating shaft of the driving motor in the slots, and being energized by different AC phases; and coils disposed between a first coil located on the outermost side and a second coil located on the innermost side, and being energized by the same AC phases as those of the first and second coils.

12 Claims, 7 Drawing Sheets

(51) Int. Cl.
*H02K 3/28* (2006.01)
*H02K 11/30* (2016.01)
*H02P 27/06* (2006.01)

(52) U.S. Cl.
CPC .......... *H02P 27/06* (2013.01); *H02K 2201/03* (2013.01); *H02K 2213/03* (2013.01)

(58) Field of Classification Search
CPC ...... H02K 2213/03; H02K 21/14; H02K 1/16; H02K 3/12; H02K 3/48; H02P 27/06
USPC ...................................................... 310/254.1
See application file for complete search history.

(56) References Cited

U.S. PATENT DOCUMENTS

| | | | |
|---|---|---|---|
| 11,196,315 B2 * | 12/2021 | Kinjo | H02P 27/08 |
| 2022/0158514 A1 * | 5/2022 | Chae | H02P 27/06 |
| 2022/0385121 A1 * | 12/2022 | Chae | H02K 11/30 |
| 2023/0052570 A1 * | 2/2023 | Chae | H02P 25/18 |

* cited by examiner

WINDING PATTERN OF A MOTOR AND A MOTOR DRIVING SYSTEM

CROSS-REFERENCE TO RELATED APPLICATION

The present application claims the benefit of and priority to Korean Patent Application No. 10-2021-0070685 filed on Jun. 1, 2021, the entire contents of which are incorporated herein by reference.

BACKGROUND

(a) Technical Field

The present disclosure provides a winding pattern of a motor and a motor driving system.

(b) Description of Related Art

As development of an electric vehicle (EV) driving motor is underway, demand for a high-performance vehicle is growing increasingly. In order to deal with the driving motor desired for the high-performance vehicle, it is desired to develop a high-torque, high-power, and high-speed motor driving system. In general, the maximum efficiency point of a driving system of a high-performance motor for an electric vehicle (EV) follows the maximum output line. In contrast, a low load is desired in an operation area where the vehicle is mainly driven (e.g., a fuel economy mode), and thus the development focusing on the driving system for the high-performance motor is unable to accord with high-efficiency design of the driving motor. In order to improve the efficiency, development of a 2-stage driving system that can selectively connect two inverters to a motor is underway.

In the motor driving system using two inverters, output efficiencies of the inverters and the motor can be further improved by applying a voltage to the motor through a control of the two inverters. However, we have discovered that in case of applying a winding pattern of a stator coil in the related art to the driving system to which the two inverters are applied, a current path occurs due to a common mode (harmonic) voltage of a driving motor, and this causes the problem of generation of common mode current. The generated common mode current is not offset, and this causes NVH deterioration and decreases the efficiency of the driving motor.

The above information disclosed in this background section is only for enhancement of understanding of the background of the present disclosure and therefore it may contain information that does not form the prior art that is already known to a person having ordinary skill in the art.

SUMMARY OF THE DISCLOSURE

The present disclosure provides a winding pattern of a motor and a motor driving system, which can reduce an influence of a common-mode voltage that degrades the performance of a driving motor.

Another aspect of the present disclosure is to provide a winding pattern of a motor and a motor driving system, which can control the number of inverters connected to a driving motor in accordance with a driving mode of a vehicle and can offset harmonics that may be generated when two inverters are connected to a driving motor.

The objects of the present disclosure are not limited to those as described above, and other unmentioned objects of the present disclosure can be clearly understood from the following description by those having ordinary skill in the art to which the present disclosure pertains (hereinafter, "ordinary technicians").

A winding pattern of a motor according to an embodiment of the present disclosure is provided. In a driving system in which a first inverter and a second inverter are connected to a driving motor, one end, i.e., a first end of a stator winding through which 3-phase current flows is connected to an output line of the first inverter, and the other end, i.e., a second end of the stator winding is connected to an output line of the second inverter, a winding pattern of a motor includes: coils which are wound in slots defined in the stator of the driving motor and to which 3-phase current is applied; coils which are wound on an innermost side and an outermost side based on a direction toward a rotating shaft of the driving motor in each of all the slots defined in the stator and which are energized by different AC phases; and coils which are disposed between a first coil located on the outermost side and a second coil located on the innermost side and which are energized by the same AC phases as the AC phases of the first coil and the second coil.

In an embodiment, the coils disposed in the slots are coils which are energized by 2-phase AC phases among 3-phase AC phases, and any one of the coils is energized by an AC phase different from the AC phase of the other adjacent coil.

In an embodiment, the 4 to 8 coils are disposed in each of the slots in even positions.

In an embodiment, the number of phase boundaries in each of the slots is smaller than the number of coils disposed in each of the slots by 1.

In an embodiment, the two to three adjacent slots are defined as a pair of slots, the coils disposed in odd positions based on the first coil disposed on the outermost side of the pair of slots are defined as fundamental parts, and the coils disposed in even positions based on the first coil disposed on the outermost side of the pair of slots are defined as short-pitch part.

In an embodiment, the coils disposed in odd positions of any one of pairs of slots adjacent to each other and the coils wound in even positions of the other pair of slots are energized by the same AC phase, and the coils wound in even positions of the other pair of slots are the short-pitch part of the coils disposed in the odd positions of the one pair of slots.

In an embodiment, the coils wound in the even positions of the other pair of slots are broken at an electric angle of 60 degrees from the coils disposed in the odd positions of the one pair of slots, and harmonics generated from the short-pitch part offset harmonics generated from the fundamental parts.

In an embodiment, 48 slots or 72 slots are provided based on 8 poles.

A motor driving system according to an embodiment of the present disclosure is provided. The motor driving system includes: a driving motor including a stator defining therein slots in which coils to which 3-phase current is applied are wound; a first inverter connected to one end of a winding of the stator through which the 3-phase current flows; a second inverter connected to the other end of the winding of the stator through which the 3-phase current flows; and a switch controlling a connection between the other end of the winding of the stator and the second inverter, wherein coils, which are energized by different AC phases on an innermost side and an outermost side based on a direction toward a rotating shaft of the driving motor, are wound on each of all the slots defined in the stator, and coils, which are energized by the same AC phases as the AC phases of a first coil and a second coil, are disposed between the first coil located on the outermost side and the second coil located on the innermost side.

In an embodiment, the switch controls a connection between the driving motor and the second inverter in accordance with a driving mode of a vehicle.

In an embodiment, in case that the driving mode of the vehicle is a high-power mode, the switch connects the driving motor and the second inverter to each other, and in case that the driving mode of the vehicle is a fuel economy mode, the switch does not connect the driving motor and the second inverter to each other.

In an embodiment, the two to three adjacent slots are defined as a pair of slots, the coils disposed in odd positions based on the first coil disposed on the outermost side of the pair of slots are defined as fundamental parts, and the coils disposed as even numbers based on the first coil disposed on the outermost side of the other pair of slots adjacent to the pair of slots are defined as short-pitch part.

In an embodiment, the coils disposed in odd positions based on the first coil disposed on the outermost side of each of the slots are energized by the same AC phases, and the coils disposed in even positions based on the first coil disposed on the outermost side of each of the slots are energized by the same AC phases.

According to the embodiments of the present disclosure, the phase voltage of the AC motor can be controlled by controlling the switch in accordance with the driving mode of the vehicle, and thus the circuit of the driving system can be changed to suit the driving mode of the vehicle. In conclusion, the efficiency of the AC motor can be increased in the high-power mode and in the fuel economy mode.

According to the embodiments of the present disclosure, since the winding pattern of the coils is wound as a short pitch winding, it is possible to form the winding pattern in which the same AC phases are applied with a difference in electric angle of 60 degrees between them. By the winding pattern in which the same AC phases are applied with a difference in electric angle of 60 degrees between them, the harmonics generated by the coils can offset each other, and thus the problem in that the NVH of the driving motor deteriorates and the loss of the driving motor is increased can be solved.

Other aspects and embodiments of the present disclosure are discussed infra.

It is understood that the term "vehicle" or "vehicular" or other similar term as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both engine power and battery power to drive the vehicle.

The above and other features of the present disclosure are discussed below.

BRIEF DESCRIPTION OF THE DRAWINGS

The above and other features of the present disclosure are now described in detail with reference to certain exemplary embodiments thereof illustrated the accompanying drawings which are given hereinafter by way of illustration only, and thus are not limitative of the present disclosure, and wherein.

Figure 1:
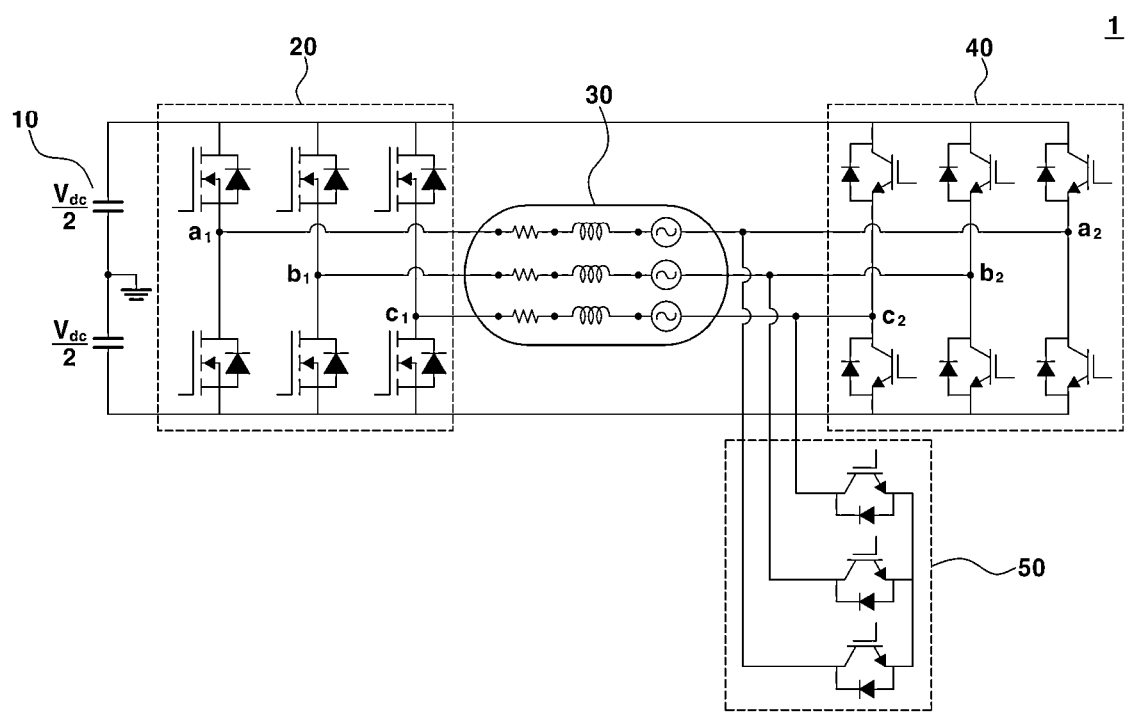
FIG. 1 is a circuit diagram illustrating a motor driving system according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes would be determined in part by the particular intended application and use environment.

In the figures, reference numbers refer to the same or equivalent parts of the present disclosure throughout the several figures of the drawing.

DETAILED DESCRIPTION

The aspects and features of the present disclosure and methods for achieving the aspects and features should be apparent by referring to embodiments to be described in detail with reference to the accompanying drawings. However, the present disclosure is not limited to the embodiments disclosed hereinafter, and it can be implemented in diverse forms. The present embodiments are provided to assist those having ordinary skill in the art in a comprehensive understanding of the disclosure, and the present disclosure is only defined within the scope of the appended claims. In the whole description, the same reference numerals denote the same constituent elements.

Further, in the description, the terms, such as "first and/or second", are for the purpose of discriminating constituent elements having the same name from each other, but the constituent elements should not be limited by the terms.

The detailed description may exemplify the present disclosure. Further, the above-described contents are to explain embodiments of the present disclosure, and the present disclosure can be used in various other combinations, modifications, and environments. That is, the present disclosure can be modified or changed within a range of the concept of the present disclosure disclosed in the description, a range equivalent to the disclosed contents as described above, and/or a range of technology or knowledge in the industry. The described embodiments are to explain the best state for implementing the technical idea of the present disclosure, and various modifications required in the detailed application field and usage of the present disclosure are possible. Accordingly, the foregoing detailed explanation of the present disclosure is not intended to limit the present disclosure to the disclosed embodiments. Further, it should be interpreted that the appended claims include other embodiments.

FIG. 1 is a circuit diagram illustrating a motor driving system according to an embodiment of the present disclosure.

Referring to FIG. 1, a motor driving system 1 may comprise a circuit that can be driven in two stages in accordance with a driving mode of a vehicle. As an example, if the driving mode of the vehicle is a high-power mode, the motor driving system 1 may be driven in an open end winding (OEW) state in which one AC motor 30 and two inverters 20 and 40 are connected together. As another example, if the driving mode of the vehicle is a fuel economy mode, the motor driving system 1 may be driven in a close end winding (CEW) state in which one AC motor 30 and one inverter 20 are connected together.

The motor driving system 1 may include: a battery 10, a first inverter 20, an AC motor 30, a second inverter 40, and a switch 50.

The battery 10 may be an energy storage device to supply an electric power for driving the motor in an eco-friendly vehicle provided with the AC motor 30 that generates a driving force for rotating wheels, such as an electric vehicle or plug-in hybrid vehicle. The battery 10 being applied to the eco-friendly vehicle may be discharged when driving the AC motor 30 and may be charged through a supply of the power from an external system.

The inverters 20 and 40 may be bi-directional inverters which selectively operate to output a plurality of AC powers having different phases through conversion of a DC power of the battery 10 or to output a power to the battery 10 through conversion of the plurality of AC powers. For example, the AC motor 30 may be driven or regenerated by 6 switching elements included in each of the inverters 20 and 40.

The first inverter 20 may have a power input terminal connected to the battery 10 and first input/output terminals a1, b1, and c1 connected to the AC motor 30. In case of driving the AC motor 30, the first inverter 20 may be provided with the power of the battery 10 through the power input terminal, convert the provided power into an AC power having a plurality of phases using switching elements, and output the AC power to a plurality of second input/output terminals a2, b2, and c2. Technology to drive the AC motor 30 using the power of 3 phases having a phase difference of 120 degrees with each other has usually been applied, and various embodiments of the present disclosure are described based on the inverters 20 and 40 and the 3-phase AC motor 30 performing 3-phase power conversion.

The AC motor 30 may be driven through reception of the converted 3-phase AC power from the inverters 20 and 40. The AC motor 30 may include a plurality of stator coils receiving an input of the plurality of AC powers having different phases from the first inverter 20.

The second inverter 40 may have the second input/output terminals a2, b2, and c2 connected to the AC motor 30. The second inverter 40 may control the reactive power of the AC motor 30. Since the second inverter 40 compensates for the reactive power component that is desired by the first inverter 20, the first inverter 20 may expand the constant output section according to a voltage limit in high-speed driving (high-power mode of a vehicle).

The switch 50 may be connected to the second input/output terminals a2, b2, and c2 connected to the second inverter 40 and the AC motor 30. The switch 50 may control a connection between the AC motor 30 and the second inverter 40 in accordance with the driving mode of the vehicle. Specifically, if the driving mode of the vehicle is a high-power mode, the switch 50 may connect the AC motor 30 and the second inverter 40 to each other, and if the driving mode of the vehicle is a fuel economy mode, the switch 50 may not connect the AC motor 30 and the second inverter 40 to each other.

As an example, in a state where one AC motor 30 and two inverters 20 and 40 are connected to each other (the switch 50 is in an ON state), the phase voltage of the AC motor 30 may be equal to a DC voltage of the battery 10. Accordingly, the state where one AC motor 30 and two inverters 20 and 40 are connected to each other may be suitable for the high-power mode of the vehicle.

As another example, in a state where one AC motor 30 and one inverter 20 are connected to each other (the switch 50 is in an OFF state), the phase voltage of the AC motor 30 may be lower than the DC voltage of the battery 10. Accordingly, as compared with the state where one AC motor 30 and two inverters 20 and 40 are connected to each other, the state where one AC motor 30 and one inverter 20 are connected to each other may be suitable for the fuel economy mode of the vehicle.

According to an embodiment of the present disclosure, the phase voltage of the AC motor 30 can be controlled by controlling the switch 50 in accordance with the driving mode of the vehicle, and thus the circuit of the driving system 1 can be changed to suit the driving mode of the vehicle. As a result, the efficiency of the AC motor 30 can be increased in the high-power mode and in the fuel economy mode.

Figure 2:
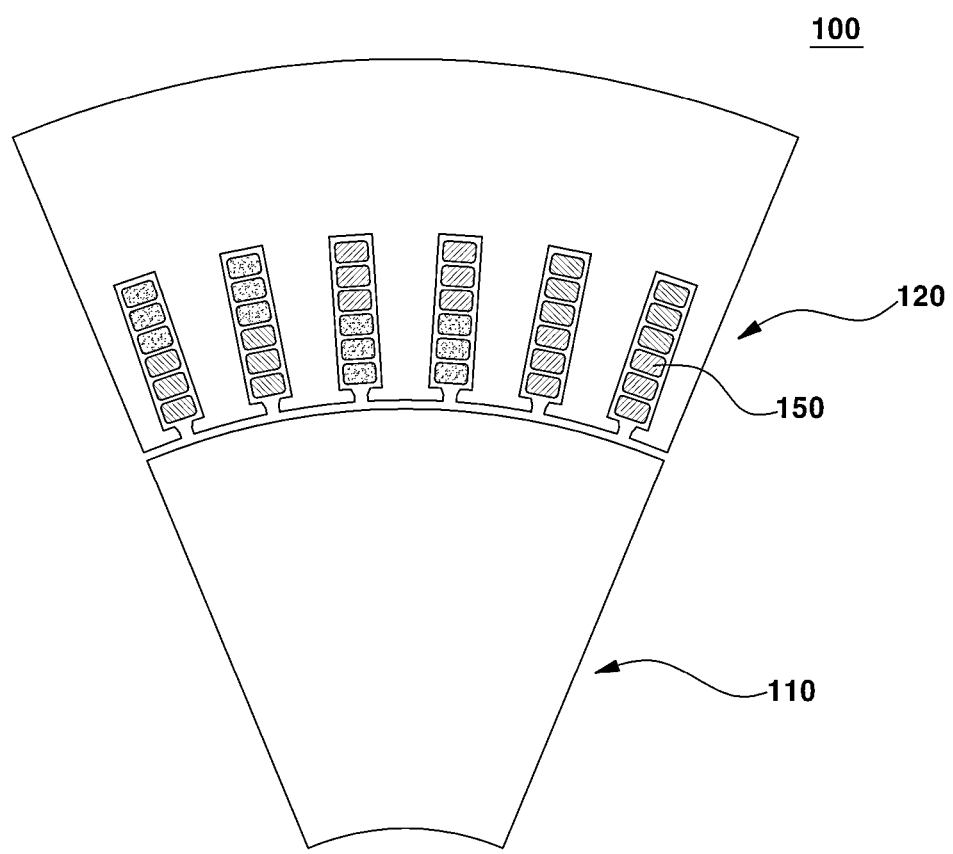
FIG. 2 is a diagram illustrating a part of a motor according to an embodiment of the present disclosure.

FIG. 2 is a diagram illustrating a part of a motor according to an embodiment of the present disclosure.

Referring to FIG. 2, a driving motor 100 may include a rotor 110 and a stator 120. The rotor 110 may include a plurality of permanent magnets 115. The stator 120 may be configured to be disposed to leave a predetermined gap with the rotor 110. In the stator 120, coils to which 3-phase current is applied may be wound. A pattern of coils wound in a plurality of slots defined in the stator 120 may be defined as a winding pattern 150. The coils having the winding pattern 150 may be connected to external terminals of the driving motor 100 and may be connected to the first inverter 20 and the second inverter 40 of FIG. 1. The rotor 110 can be rotated through the current being applied to the stator 120.

The winding pattern according to an embodiment of the present disclosure may be wound as a 2-distribution short-pitch winding. For example, current of different AC phases is applied to a plurality of coils, and the plurality of coils may be wound in slots defined in the stator 120. The plurality of coils, to which current of the same AC phases is applied, may be disposed to have an electric angle difference of 60 degrees from each other. Since the plurality of coils, to which the current of the different AC phases is applied, are wound in the respective slots, and the plurality of coils, to which the current of the same AC phase is applied, are disposed to have the electric angle difference of 60 degrees from each other, harmonics that may be generated by the winding pattern 150 may offset each other.

Figure 3:
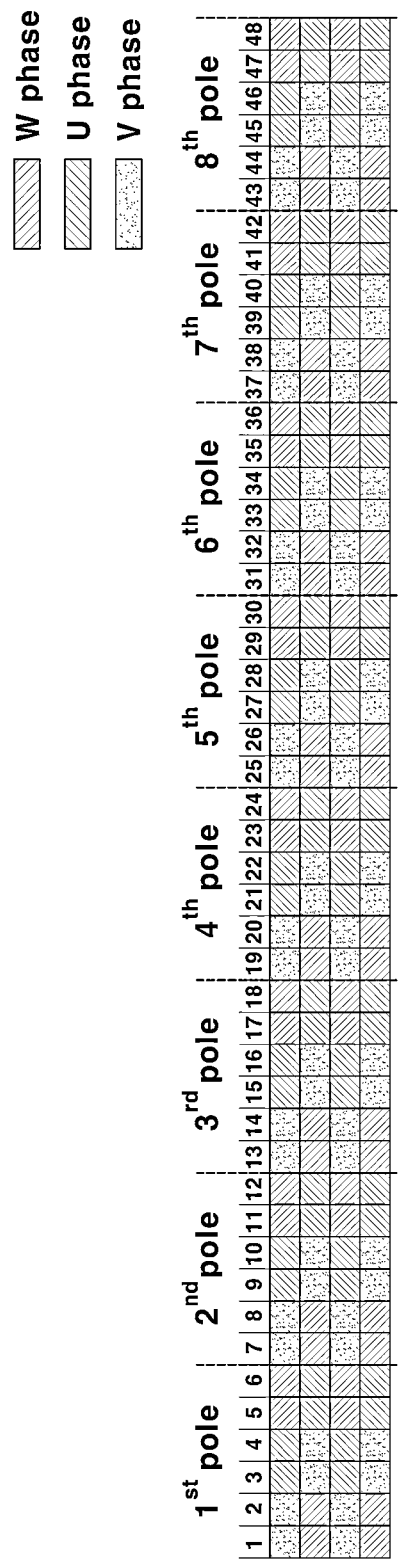
FIG. 3 is a diagram illustrating a winding pattern of a motor according to an embodiment of the present disclosure.

FIG. 3 is a diagram illustrating a winding pattern of a motor according to an embodiment of the present disclosure.

Referring to FIG. 2 and FIG. 3, a plurality of slots may be defined in a stator 120. For example, 48 slots may be provided based on eight poles of a driving motor 100. According to an embodiment of the present disclosure, two adjacent slots may be defined as a pair of slots, and coils (not illustrated), to which current of two AC phases is applied, may be wound in the pair of slots. However, the pair of slots may include three or more adjacent slots.

In one slot, two coils (not illustrated) may be wound to apply current of different AC phases. In this case, the coils (not illustrated) may be wound as 2-distribution short-pitch winding. The two distribution means that two coils (not illustrated), to which the same AC phases are successively applied, are disposed based on a horizontal direction of the slots (not illustrated), and may mean that two slots (not illustrated) are defined as a pair of slots, and coils (not illustrated), to which current of different AC phases is applied, are wound in each of the pair of slots. The winding pattern of the coils (not illustrated) is described in detail with reference to FIG. 4.

Coils (not illustrated) are energized by different AC phases on an innermost side and an outermost side based on a direction toward a rotating shaft of the driving motor 100, and the coils may be wound on each of all the slots defined in the stator. In one form, four coils (not illustrated) may be wound in one slot, and coils (not illustrated), which are energized by the same AC phases as the AC phases of a first coil and a second coil, are disposed between the first coil that is the outermost coil and the second coil that is the innermost coil. In other words, the coils disposed in odd positions based on the first coil may be energized by the same AC phase as the AC phase of the first coil, and the coils disposed in even positions based on the first coil may be energized by the same AC phase as the AC phase of the second coil. The coils disposed in the respective slots may be coils which are energized by 2-phase AC phases among 3-phase AC phases. Any one of the coils disposed in the respective slots may be energized by an AC phase different from the AC phase of the other adjacent coil.

As an example, 4 coils may be disposed in one slot. The coils disposed in odd positions based on the first coil disposed on the outermost side in the slot may be energized by the same AC phases, and the coils disposed in even positions based on the first coil disposed on the outermost side in the slot may be energized by the same AC phases. The coils disposed in odd positions of any one of pairs of slots adjacent to each other and the coils disposed in the even positions of the other pair of slots may be energized by the same AC phases. The coils disposed in odd positions of the any one pair of slots may be defined as fundamental parts, and the coils disposed in even positions of the other pair of slots may be defined as short-pitch part. The fundamental parts and the short-pitch part may be called the coils being energized by the same AC phases, and the short-pitch part may be broken at an electric angle of 60 degrees from the fundamental parts.

As an example, the coils, to which V-phase current is applied, may be wound on the outermost coils of the $1^{st}$ slot and $2^{nd}$ slot of a $1^{st}$ pole and the coils disposed as in odd positions based on the outermost coils, and the coils, to which W-phase current is applied, may be wound on the coils disposed in even positions based on the outermost coils of the $1^{st}$ slot and $2^{nd}$ slot of the $1^{st}$ pole. The coils, to which V-phase current is applied, may be wound on the coils disposed firstly and thirdly based on the farthest side based on the direction toward the rotating shaft of the driving motor 100. The coils, to which W-phase current is applied, may be wound on the coils disposed secondly and fourthly based on the farthest side based on the direction toward the rotating shaft of the driving motor 100. The coils, to which V-phase current is applied, may be wound on an innermost coils of the $3^{rd}$ slot and $4^{th}$ slot of the $1^{st}$ pole and the coils disposed in odd positions based on the innermost coils, and the coils, to which U-phase current is applied, may be wound on the coils disposed in the even positions based on the innermost coils of the $3^{rd}$ slot and $4^{th}$ slot of the $1^{st}$ pole. In other words, the coils, to which U-phase current is applied, may be wound on the coils disposed firstly and thirdly based on the farthest side based on the direction toward the rotating shaft of the driving motor 100, and the coils, to which W-phase current is applied, may be wound on the coils disposed secondly and fourthly based on the farthest side based on the direction toward the rotating shaft of the driving motor 100. The outermost coils of the $1^{st}$ slot and $2^{nd}$ slot of the $1^{st}$ pole may be the fundamental parts, and the coils disposed in the odd positions based on the innermost coils of the $3^{rd}$ slot and $4^{th}$ slot of the $1^{st}$ pole may be the short-pitch part of the outermost coils of the $1^{st}$ slot and $2^{nd}$ slot of the $1^{st}$ pole. Further, the coils disposed thirdly based on the outermost coils of the $1^{st}$ slot and $2^{nd}$ slot of the $1^{st}$ pole may be the fundamental parts, and the innermost coils of the $3^{rd}$ slot and $4^{th}$ slot of the $1^{st}$ pole may be the short-pitch part of the coils disposed thirdly based on the outermost coils of the $1^{st}$ slot and $2^{nd}$ slot of the $1^{st}$ pole.

The above-described pattern may be formed in the same manner over the whole 8 poles of the driving motor 100.

Figure 4:
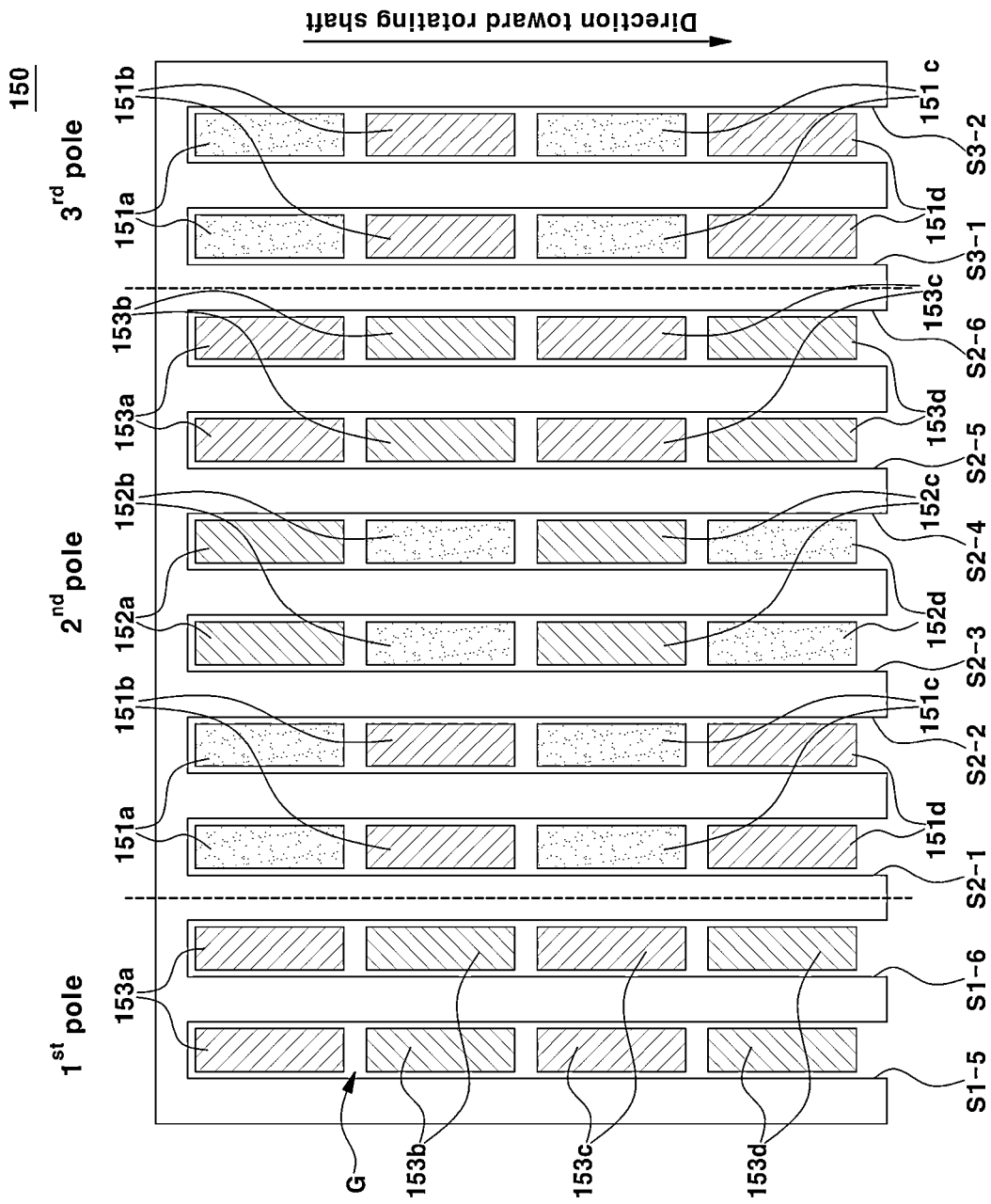
FIG. 4 is a diagram illustrating a winding pattern of a motor and wound coils according to an embodiment of the present disclosure.

FIG. 4 is a diagram illustrating a coil winding pattern of a motor and wound coils according to an embodiment of the present disclosure.

Referring to FIGS. 2-4, 6 slots may be defined in one pole. FIG. 4 is illustrated around the $2^{nd}$ pole. In the $2^{nd}$ pole, a first slot S2-1, a second slot S2-2, a third slot S2-3, a fourth slot S2-4, a fifth slot S2-5, and a sixth slot S2-6 may be provided. Four coils may be inserted into each of the slots. Coils of the same winding pattern may be wound in a pair of slots adjacent to each other. For example, the coils of the same winding pattern may be wound in the first slot S2-1 and the second slot S2-2, the coils of the same winding pattern may be wound in the third slot S2-3 and the fourth slot S2-4, and the coils of the same winding pattern may be wound in the fifth slot S2-5 and the sixth slot S2-6.

A first coil 151*a*, a second coil 151*b*, a third coil 151*c*, and a fourth coil 151*d* may be wound in the first slot S2-1 and the second slot S2-2 of the $2^{nd}$ pole. A first coil 152*a*, a second coil 152*b*, a third coil 152*c*, and a fourth coil 152*d* may be wound in the third slot S2-3 and the fourth slot S2-4 of the $2^{nd}$ pole. A first coil 153*a*, a second coil 153*b*, a third coil 153*c*, and a fourth coil 153*d* may be wound in the fifth slot S2-5 and the sixth slot S2-6 of the $2^{nd}$ pole. The outermost coils in the direction toward the rotating shaft of the driving motor 100 may be the first coils 151*a*, 152*a*, and 153*a*, and the innermost coils in the direction toward the rotating shaft of the driving motor 100 may be the fourth coils 151*d*, 152*d*, and 153*d*.

As an example, the first coil 151*a* and the third coil 151*c* disposed in the odd positions based on the coils disposed on the outermost side of the first slot S2-1 and the second slot S2-2, being a pair of slots, may be defined as the fundamental parts. The second coil 151*b* and the fourth coil 151*d* disposed in the even positions based on the coils disposed on the outermost side of the first slot S2-1 and the second slot S2-2, being a pair of slots, may be defined as the short-pitch part. The first coil 152*a* and the third coil 152*c* disposed in the odd positions based on the coils disposed on the outermost side of the third slot S2-3 and the fourth slot S2-4, being a pair of slots, may be defined as the fundamental parts. The second coil 152*b* and the fourth coil 152*d* disposed in the even positions based on the coils disposed on the outermost side of the third slot S2-3 and the fourth slot S2-4, being a pair of slots, may be defined as the short-pitch part. The first coil 153*a* and the third coil 153*c* disposed in the odd positions based on the coils disposed on the outermost side of the fifth slot S2-5 and the sixth slot S2-6, being a pair of slots, may be defined as the fundamental parts. The second coil 153b and the fourth coil 153d disposed in the even positions based on the coils disposed on the outermost side of the fifth slot S2-5 and the sixth slot S2-6, being a pair of slots, may be defined as the short-pitch part.

As an example, the coils disposed in the odd positions of any one of pairs of slots adjacent to each other and the coils wound in the even positions of the other pair of slots may be energized by the same AC phases. The first coil 151a and the third coil 151c wound in the first slot S2-1 and the second slot S2-2, being a pair of slots, may be energized by the same AC phases as the AC phases of the second coil 152b and the fourth coil 152d wound on the third slot S2-3 and the fourth slot S2-4. In this case, the first coil 151a and the third coil 151c of the first slot S2-1 and the second slot S2-2 may be the fundamental parts, and the second coil 152b and the fourth coil 152d of the third slot S2-3 and the fourth slot S2-4 may be the short-pitch part of the first coil 151a and the third coil 151c. Further, the first coil 152a and the third coil 152c of the third slot S2-3 and the fourth slot S2-4 may be the fundamental parts, and the second coil 153b and the fourth coil 153d of the fifth slot S2-5 and the sixth slot S2-6 may be the short-pitch part of the first coil 152a and the third coil 152c. Further, the first coil 153a and the third coil 153c of the fifth slot S2-5 and the sixth slot S2-6 may be the fundamental parts, and the second coil 151b and the fourth coil 151d wound in the first slot S3-1 of the $3^{rd}$ pole may be the short-pitch part of the first coil 153a and the third coil 153c.

The coils wound in the even positions of the other pair of slots may be broken at an electric angle of 60 degrees from the coils disposed in the odd positions of the one pair of slots, and harmonics generated from the short-pitch part may offset harmonics generated from the fundamental parts.

The number of phase boundaries in each of the slots is smaller than the number of coils disposed in each of the slots by 1. A gap G may exist between the first coils 151a, 152a, and 153a and the second coils 151b, 152b, and 153b, and the gap G may be defined as the boundary between the coils to which different AC phases are applied. Further, a gap G may exist between the second coils 151b, 152b, and 153b and the third coils 151c, 152c, and 153c, and a gap G may exist between the third coils 151c, 152c, and 153c and the fourth coils 151d, 152d, and 153d. According to an embodiment of the present disclosure, since 4 coils are wound in each of the slots, the number of boundaries between the coils may be 3.

The above-described pattern may be formed in the same manner over the whole 8 poles of the driving motor 100. That is, the coil, to which any one AC phase is applied, and the short-pitch part of the coil are not disposed in the pair of slots, but the coil, to which any one AC phase is applied, may be wound in the pair of slots and the short-pitch part of the coil may be wound in the pair of slots adjacent to each other. Through this, the electric angle between the fundamental part and the short-pitch part of the coil may show a difference of 60 degrees, and thus the harmonics generated from the fundamental part of the coil and the short-pitch part of the coil may offset each other.

Figure 5:
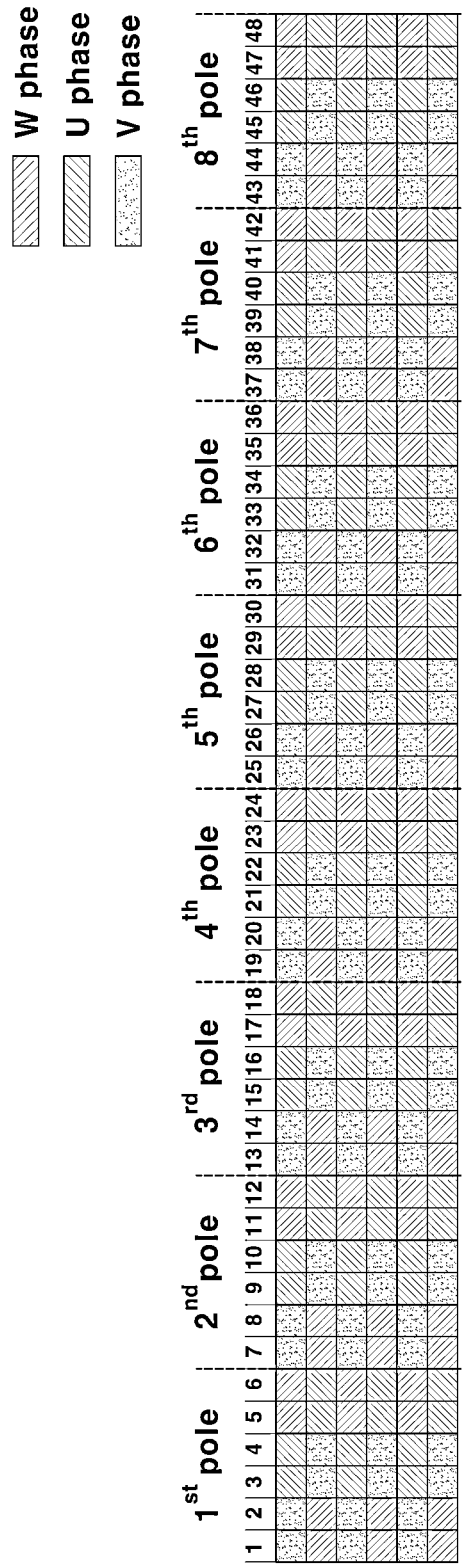
FIG. 5 is a diagram illustrating a winding pattern of a motor according to another embodiment of the present disclosure.

FIG. 5 is a diagram illustrating a winding pattern of a motor according to another embodiment of the present disclosure. For simplicity in explanation, description of the duplicate contents is omitted.

Referring to FIG. 2 and FIG. 5, forty eight slots may be provided based on eight poles, and six coils may be wound in each of the slots. Current of two AC phases may be applied to the coils wound in the respective slots.

As an example, the coils disposed in odd positions based on the coil disposed on the outermost side of a pair of slots may be defined as fundamental parts. The coils disposed in even positions based on the coil disposed on the outermost side of the pair of slots may be defined as short-pitch part. The coils disposed in the odd positions in one pair of slots and the coils disposed in the even positions in the other pair of slots adjacent to the one pair of slots may be energized by the same AC phases. In an embodiment of the present disclosure, in case that one pair of slots may be a first slot and a second slot, the other pair of slots may be a third slot and a fourth slot.

Specifically, the coil disposed firstly in one pair of slots disposed on the outermost side in the direction toward the rotating shaft of the driving motor 100 and the coil disposed secondly in the other pair of slots may be energized by the same AC phases. The coil disposed thirdly in one pair of slots disposed on the outermost side in the direction toward the rotating shaft of the driving motor 100 and the coil disposed fourthly in the other pair of slots may be energized by the same AC phases. The coil disposed fifthly in one pair of slots disposed on the outermost side in the direction toward the rotating shaft of the driving motor 100 and the coil disposed sixthly in the other pair of slots may be energized by the same AC phases.

Further, current of the same AC phases may be applied to the coils disposed in the odd positions of one pair of slots, and current of the same AC phases may be applied to the coils disposed in the even positions in the pair of slots. The coils disposed in the odd positions of the pair of slots and the coils disposed in the even positions in the pair of slots may be energized by different AC phases.

The above-described pattern may be formed in the same manner over the whole eight poles of the driving motor 100.

Unlike the above-described example, 72 slots may be provided based on 8 poles.

Figure 6:
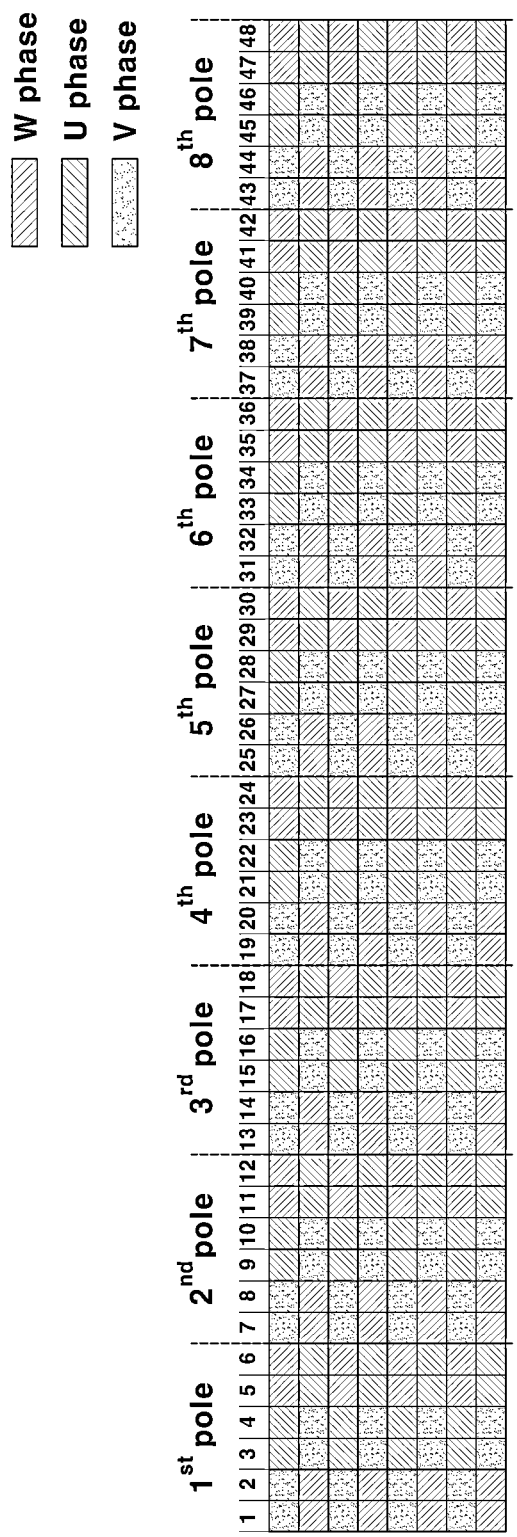
FIG. 6 is a diagram illustrating a winding pattern of a motor according to still another embodiment of the present disclosure.

FIG. 6 is a diagram illustrating a winding pattern of a motor according to still another embodiment of the present disclosure. For simplicity in explanation, description of the duplicate contents is omitted.

Referring to FIG. 2 and FIG. 6, forty eight slots may be provided based on eight poles, and 8 coils may be wound in each of the slots. Current of two AC phases may be applied to the coils wound in the respective slots. The coils disposed in the odd positions in one pair of slots and the coils disposed in the even positions in the other pair of slots adjacent to the one pair of slots may be energized by the same AC phases.

Further, the coil disposed firstly in one pair of slots disposed on the outermost side in the direction toward the rotating shaft of the driving motor 100 and the coil disposed secondly in the other pair of slots may be energized by the same AC phases. The coil disposed thirdly in one pair of slots disposed on the outermost side in the direction toward the rotating shaft of the driving motor 100 and the coil disposed fourthly in the other pair of slots may be energized by the same AC phases. The coil disposed fifthly in one pair of slots disposed on the outermost side in the direction toward the rotating shaft of the driving motor 100 and the coil disposed sixthly in the other pair of slots may be energized by the same AC phases. The coil disposed seventhly in one pair of slots disposed on the outermost side in the direction toward the rotating shaft of the driving motor 100 and the coil disposed eighthly in the other pair of slots may be energized by the same AC phases.

Further, current of the same AC phases may be applied to the coils disposed in the odd positions of one pair of slots, and current of the same AC phases may be applied to the coils disposed in the even positions in the pair of slots. The coils disposed in the odd positions of the pair of slots and the coils disposed in the even positions in the pair of slots may be energized by different AC phases.

The above-described pattern may be formed in the same manner over the whole eight poles of the driving motor 100.

Unlike the above-described example, 72 slots may be provided based on 8 poles.

Figure 7:
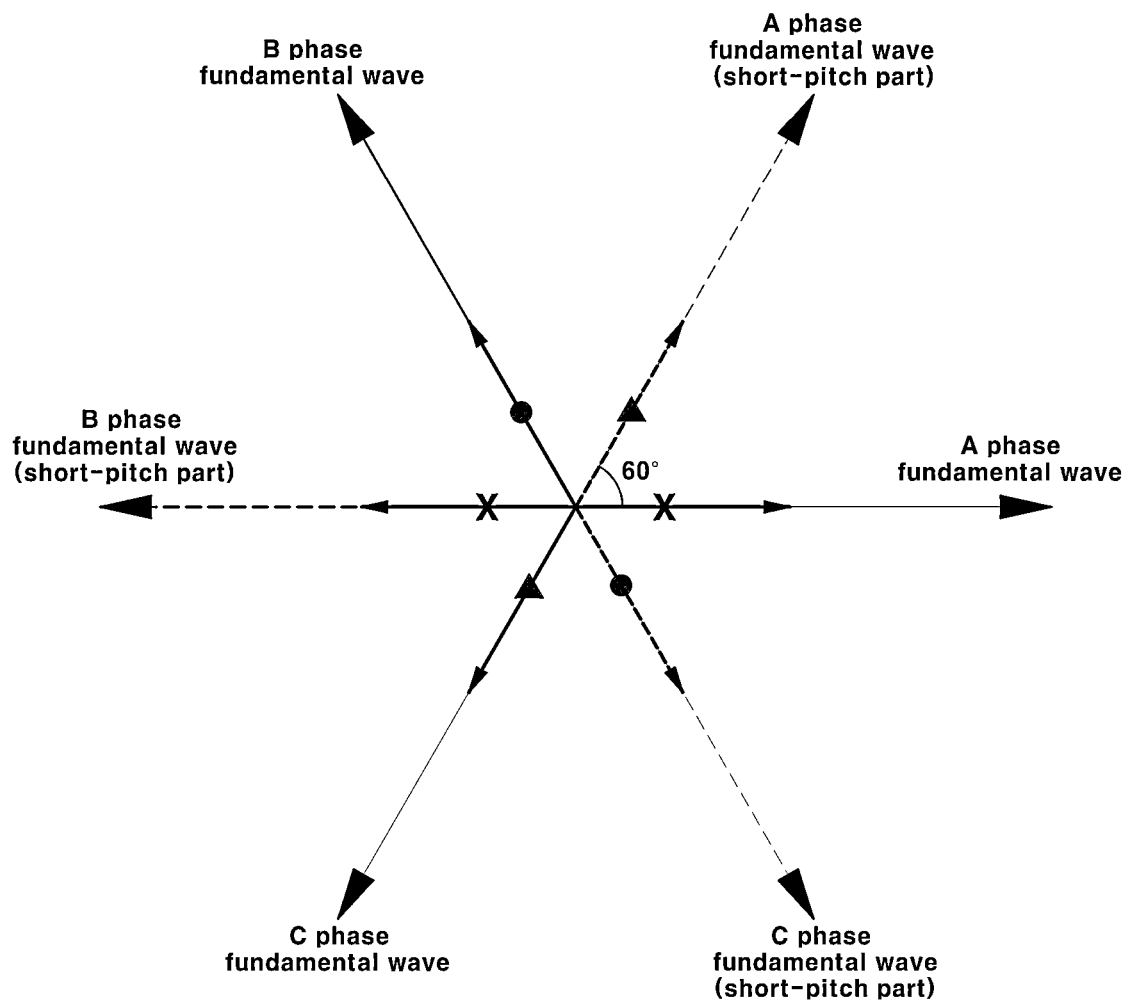
FIG. 7 is a diagram explaining offsets of harmonics according to an embodiment of the present disclosure.

FIG. 7 is a diagram explaining offsets of harmonics according to an embodiment of the present disclosure.

Referring to FIG. 1 and FIG. 7, third harmonics may be respectively generated in 3-phase current. Specifically, the 3-phase current may mean A-phase fundamental waves, B-phase fundamental waves, and C-phase fundamental waves, and the third harmonics may be generated in the A-phase fundamental waves, B-phase fundamental waves, and C-phase fundamental waves, respectively.

In a motor driving system (1-stage) in the related art using only one inverter, the power of the battery 10 may be applied to Y connection of the driving motor 30. In the Y connection of the driving motor 30, the third harmonics being generated by the 3-phase current through line-to-line control have the same levels and the same phases. Accordingly, the third harmonics offset each other. However, in a motor driving system (2-stage) using two inverters according to the present disclosure, the power of the battery 10 may be applied to the respective phases of the driving motor 30. Accordingly, it is possible to implement high-performance design and high-efficiency design of the motor driving system, but the third harmonics being generated in the 3-phase current do not basically offset each other. If the third harmonics do not offset each other, heat generation and efficiency deterioration of the driving motor 30 may occur. Further, if the harmonics exist, noise, vibration, and harshness (NVH) of the driving motor may be increased.

According to the embodiments of the present disclosure, fundamental waves being generated from the fundamental parts of the coils and short-pitch waves being generated from the short-pitch part of the coils may exist, and the third harmonics may be generated in the fundamental waves and the short-pitch waves. Since the fundamental waves and the short-pitch waves may have a phase difference of 60 degrees, the harmonics generated from the fundamental waves and the harmonics generated from the short-pitch waves may also have the phase difference of 60 degrees. However, according to the embodiments of the present disclosure, since the harmonics generated from the fundamental waves and the harmonics generated from the short-pitch waves have the phase difference of 60 degrees, they can offset each other. Accordingly, the problems of the NVH deterioration and the loss increase of the driving motor can be solved.

Although the present disclosure has been described with reference to the embodiment(s) illustrated in the drawings, it should be understood that the present disclosure can be embodied in other specific forms by those having ordinary skill in the art to which the present disclosure pertains without changing the technical idea or essential features of the present disclosure. Accordingly, it should be understood that the embodiment(s) as described above are exemplary and are not limited in all aspects.

What is claimed is:

1. A winding pattern of a driving motor in a driving system in which a first inverter and a second inverter are connected to the driving motor, a first end of a stator winding through which 3-phase current flows is connected to an output line of the first inverter, and a second end of the stator winding is connected to an output line of the second inverter, the winding pattern comprising:
   coils, which are wound in slots defined in the stator of the driving motor and to which 3-phase current is applied;
   coils, which are wound on an innermost side and an outermost side defined by a direction toward a rotating shaft of the driving motor in each of all the slots defined in the stator and which are energized by different AC phases; and
   coils, which are disposed between a first coil located on the outermost side and a second coil located on the innermost side and which are energized by the same AC phases as the AC phases of the first coil and the second coil,
   wherein the coils disposed in odd positions based on the first coil disposed on the outermost side of each of the slots are energized by the same AC phases, and
   wherein the coils disposed in even positions based on the first coil disposed on the outermost side of each of the slots are energized by the same AC phases.

2. The winding pattern of claim 1, wherein the coils disposed in the slots are coils which are energized by 2-phase AC phases among 3-phase AC phases, and
   any one of the coils is energized by an AC phase different from the AC phase of the other adjacent coil.

3. The winding pattern of claim 1, wherein four to eight coils are disposed in each of the slots in even positions.

4. The winding pattern of claim 3, wherein a number of phase boundaries in each of the slots is smaller than a number of coils disposed in each of the slots by 1.

5. The winding pattern of claim 1, wherein two to three adjacent slots are defined as a pair of slots,
   the coils disposed in odd positions based on the first coil disposed on the outermost side of the pair of slots are defined as fundamental parts, and
   the coils disposed in even positions based on the first coil disposed on the outermost side of the pair of slots are defined as short-pitch part.

6. The winding pattern of claim 5, wherein the coils disposed in the odd positions of any one of pairs of slots adjacent to each other and the coils wound in even positions of the other pair of slots are energized by the same AC phase, and
   the coils wound in the even positions of the other pair of slots are the short-pitch part of the coils disposed in the odd positions of the one pair of slots.

7. The winding pattern of claim 6, wherein the coils wound in the even positions of the other pair of slots are broken at an electric angle of 60 degrees from the coils disposed in the odd positions of the one pair of slots, and
   harmonics generated from the short-pitch part offset harmonics generated from the fundamental parts.

8. The winding pattern of claim 1, wherein forty eight slots or seventy two slots are provided based on eight poles.

9. A motor driving system comprising:
   a driving motor including a stator defining therein slots in which coils to which 3-phase current is applied are wound;
   a first inverter connected to a first end of a winding of the stator through which the 3-phase current flows;
   a second inverter connected to a second end of the winding of the stator through which the 3-phase current flows; and
   a switch configured to control an electric connection between the second end of the winding of the stator and the second inverter, wherein coils, which are energized by different AC phases on an innermost side and an outermost side defined by a direction toward a rotating shaft of the driving motor, are wound on each of all the slots defined in the stator, wherein coils, which are energized by the same AC phases as the AC phases of a first coil and a second coil, are disposed between the first coil located on the outermost side and the second coil located on the innermost side, wherein the coils disposed in odd positions based on the first coil disposed on the outermost side of each of the slots are energized by the same AC phases, and wherein the coils disposed in even positions based on the first coil disposed on the outermost side of each of the slots are energized by the same AC phases.

10. The motor driving system of claim 9, wherein the switch is configured to control an electric connection between the driving motor and the second inverter based on a driving mode of a vehicle.

11. The motor driving system of claim 10, wherein when the driving mode of the vehicle is a high-power mode, the switch connects the driving motor and the second inverter to each other, and when the driving mode of the vehicle is a fuel economy mode, the switch does not connect the driving motor and the second inverter to each other.

12. The motor driving system of claim 10, wherein two to three adjacent slots are defined as a pair of slots, the coils disposed in odd positions based on the first coil disposed on the outermost side of the pair of slots are defined as fundamental parts, and the coils disposed in even positions based on the first coil disposed on the outermost side of the other pair of slots adjacent to the pair of slots are defined as short-pitch part.

* * * * *